United States Patent [19]

Tonouchi et al.

[11] 4,117,174
[45] Sep. 26, 1978

[54] METHOD FOR PRODUCING TOFU-LIKE FOOD

[75] Inventors: Takeo Tonouchi; Akio Tonouchi, both of Ina; Makoto Shiroshima; Yuichi Chimura, both of Nagano; Kazuyoshi Ohkubo, Yamagata, all of Japan

[73] Assignee: Nagano-Ken Kohridofu Kogyo Cooperative Association, Nagano, Japan

[21] Appl. No.: 776,733

[22] Filed: Mar. 11, 1977

[30] Foreign Application Priority Data

Mar. 13, 1976 [JP] Japan .................................. 51-27381

[51] Int. Cl.² .............................................. A23L 1/20
[52] U.S. Cl. .................................... 426/634; 426/508; 426/524
[58] Field of Search ............... 426/104, 629, 634, 656, 426/524, 802, 508

[56] References Cited

U.S. PATENT DOCUMENTS

| | | | |
|---|---|---|---|
| 3,490,914 | 1/1970 | Okumura et al. | 426/524 X |
| 3,870,808 | 3/1975 | Boyer et al. | 426/524 X |
| 3,922,359 | 11/1975 | Hashizume et al. | 426/524 X |
| 3,950,550 | 4/1976 | Katayama et al. | 426/656 X |
| 4,001,459 | 1/1977 | Kim et al. | 426/656 |

FOREIGN PATENT DOCUMENTS

17,820 3/1968 Japan ........................................ 426/634

OTHER PUBLICATIONS

Smith, et al., "Soybeans: Chemistry and Technology," vol. 1, The Avi Publ. Co., Inc., Westport, Conn., 1972, p. 378.

*Primary Examiner*—Robert A. Yoncoskie
*Attorney, Agent, or Firm*—Flynn & Frishauf

[57] ABSTRACT

A method of producing tofu-like food consisting of preparing a 1/9 - ¼ by weight water solution of crushed soybeans, heating said solution at a temperature of 60° C - 100° C, preparing a stable suspension by further crushing and dispersing said soybeans in said solution, freezing said suspension rapidly at a temperature of −50° C - −10° C, and then ripening said suspension at a temperature of −10° C - −3° C to texturize protein therein.

6 Claims, 2 Drawing Figures

METHOD FOR PRODUCING TOFU-LIKE FOOD

BACKGROUND OF THE INVENTION

This invention relates to a method of producing tofu-like food from soybeans as raw materials.

Tofu or a soft vegetable cheese prepared from soybean milk has been widely used as a precious protein-rich food in Japan, and is expected to acquire worldwide demand. The conventional method for producing such tofu generally includes first washing material soybeans with water, immmersing and swelling them in water, crushing, watering and heating the swollen soybeans, and then filtering them to obtain soybean milk. The resultant residue is called "okara". Such soybean milk is coagulated by a coagulant, e.g. a calcic salt such as calcium sulphate, a separated solution (called "yu") is removed, the coagulated milk is poured into a mold box, a pressing lid is placed thereon for pressurization, additional "yu" is removed, and then the resultant solidified milk is placed in a water bath for water bleaching.

In such conventional method, the "okara" and "yu" portion produced at time of coagulation and forming are to be abandoned, so that the yield of the final products is as low as about 50%. These "okara" and "yu" portion, however, contain a great quantity of nutriment therein. For example, the "okara" still contains 30% or more solid matter, 20% or more of protein, 30% or more of fat, and 50% or more of carbohydrates as compared with the respective ingredients contained in the soybeans. Meanwhile, the "yu" portion also contains e.g. 30% or more of carbohydrates, 50% or more of ash, 40% or more of calcium and other ingredients as compared with the respective ingredients contained in the soybeans.

In these remaining ingredients are contained organic nitrogenous compounds, such as various amino acids and peptide, and low molecular carbohydrates, such as sucrose, vitamins as well as highly nutritious high molecular compounds, such as albuminous protein and hemicellulose. Meanwhile, the abandoned "yu" portion has become a source of contamination of rivers, requiring waste water disposal plants.

Further, the tofu may be available as the so-called "frozen tofu" if it is subjected to further freezing and ripening for spongy texturization and dried, having a required softening treatment with liquid ammonia or a water (called "kansui") mixed with potassium carbonate and sodium carbonate at time of cooking because of the aforementioned coagulation with salts at time of production. However, such softening process is not desirable because the liquid ammonia or "kansui" would throw the original nutrition of the soybeans off balance.

SUMMARY OF THE INVENTION

An object of this invention is to provide an improved method for producing tofu-like food wherein a higher yield of products will be obtained and no coagulant is required to be added.

That is, this invention provides a method for producing tofu-like food characterized by preparing a water slurry containing 1/9 to ¼ (by weight) of crushed soybeans, heating said slurry at a temperature of 60° C.-100° C., preparing a stable suspension by further crushing and dispersing said soybeans in said slurry, freezing said suspension rapidly at a temperature of −50° C. - −10° C., and then ripening said suspension at a temperature of −10° C. - −3° C., preferably −5° C. -3° C. for a sufficient period of time to texturize protein therein.

DETAILED DESCRIPTION OF THE PREFERRED EMBODIMENTS

Figure 1:
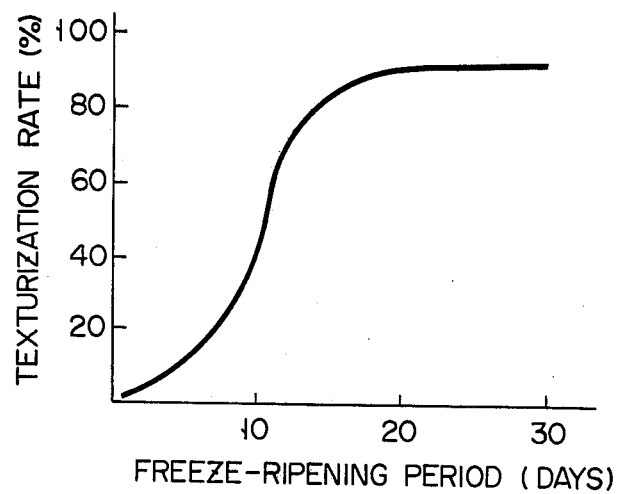
FIG. 1 is a diagram illustrative of the relation between the freezing/ripening period and the texturization rate.

In preparing a 1/9 to ¼ water slurry of crushed soybeans from entire soybeans as raw materials, the soybeans are first cleared of impurities and washed, and then immersed in water for 6–18 hours for swelling to a proper degree. Thereafter, they are boiled for 20–40 minutes or subjected to instantaneous heated-vapor treatment for several seconds, preferably for 10 seconds, thereby inactivating enzyme including lipoxidase to prevent emission of leguminous smell attributable to such enzyme. In doing this, such instantaneous heated-vapor treatment may provide a slurry that is a solution containing dispersed soybean particles having a low viscosity because it never causes substantial denaturing of the protein contained in soybeans. Water is added to the soybeans deodorized in this way to give the ratio of water to soybeans at 3 or 8:1 by weight, and crushed into a solution containing a dispersed phase, that is a slurry by using a conventional crusher. If the added water is less than three times as much as the soybeans in volume, it will be difficult to obtain a stable suspension in the subsequent crushing process. Meanwhile, if the water exceeds eight times as much as the soybeans in volume, the protein will not be able to be texturized satisfactorily by the later rapid freezing and ripening.

When using defatted soybeans instead of the entire soybeans as the raw materials, the defatted soybeans may in general have been deodorized previously. So, in this case, there may not be required such boiling or instantaneous heated-vapor treatment as described above but only adding water thereto, eight times as much as the materials or soybeans and then crushing the soybean content of the resultant slurry.

The said aqueous slurry of crushed soybeans, heated at a temperature of 60° C. -100° C., may be crushed into a suspension by means of a suitable mixer such as a disperser and homogenizer, and heated at a temperature within the above range simultaneously with or subsequently to said crushing process. This heating process with the intention of causing thermal denaturation of protein is usually performed at a temperature of 100° C. varying with the heating temperature for 30 minutes. When using a disperser, the crushing process is usually performed at 300 kg/cm$^2$–500 kg/cm$^2$ and, preferably, repeated twice or more. Simultaneous heating and crushing of the dispersion of soybeans in water will substantially improve the dispersibility of the particles. Meanwhile, when using a homogenizer as a crushing means, the precipitated portions, which should be produced more or less, may be removed by centrifuging.

In such crushing process, all or the greater part of the material of the soybeans is available in the form of a stable suspension, and the abandoned ingredient or "okara", which used to be produced in the conventional method, is never produced or, if any, produced in a quite small amount in the form of coarse particles left uncrushed.

The suspension is placed and preferably sealed in a suitable container such as an aluminium tray or plastic container, and frozen rapidly down to $-50°$ C. - $-10°$ C. by means of brine or the like. The size of frozen crystals may be varied by adjusting the speed of the rapid freezing and the temperature properly, thereby providing a variety of texture of final products, fine or coarse. That is, the higher the freezing speed is or the lower the temperature is, the finer the frozen crystals obtained are, thereby we can obtain finer texture of the final products. After the rapid freezing, the suspension is gradually thawed to a temperature of $-10°$ C. - $-3°$ C., at which said suspension is ripened for a sufficient period of time, typically for 2 or 3 weeks, to texturize protein contained therein.

Here the judgment on whether the texturization of the protein is accomplished fully or not is made on the basis of whether the product is coagulated to such a degree as not to drop through the meshes of a 100-mesh wire net when said product, cut in a regular size (8cm × 6cm × 1.5cm), is placed thereon.

In this way, the whole of the suspension may be texturized by ripening, so that the "yu" portion encountered in the prior art is not produced and there is no necessity to add coagulants.

Figure 2:
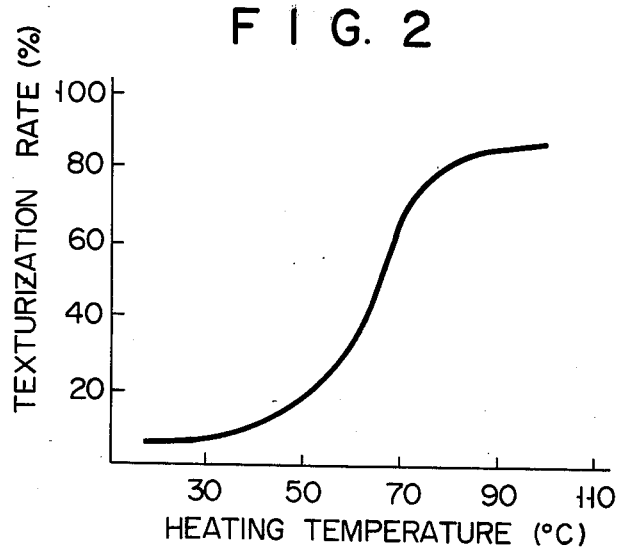
FIG. 2 is a diagram illustrative of the relation between the heating temperature and the texturization rate.

Thus, according to this invention, a fully texturized food may be obtained only by freezing and ripening without employing any coagulants which are essential in the conventional method, while it is to be understood easily that such performance is realized on the basis of the heat and freeze treatments of the soybean protein. Further, the mechanism of such performance may be assumed to be attributable to the intermolecular action based on the condensation and drying (dehydration) accompanying freezing of the thermal denatured protein. The texturization rate according to the thermal denaturing and freezing/ripening of the soybean protein is as shown in FIG. 1 and FIG. 2. That is, FIG. 1 illustrates the relation between the texturization rate and the ripening period for a product when a high concentration (i.e., a 1/6) suspension of entire soybeans in water is heated at a temperature of 100° C. for 25 minutes, while FIG. 2 illustrates the relation between the heating temperature and the ripening rate for a suspension of soybeans of the same kind. In the latter case, ripening is performed at a temperature of $-10°$ C. - $-3°$ C., preferably $-5°$ C. - $-3°$ C. for 14 days. Here the texturization rate is calculated as follows:

$$\text{Texturization rate} = \frac{\text{*Weight of caked solid (g)}}{\text{Weight of solid components in the suspension (g)}} \times 100$$

*Weight of caked solid (g) = [Weight of solid components in the suspension (g)] − [A concentration of solid particles smaller than 100 mesh in a filtrate] × [An amount of water added to the suspension (g)]

As may be seen clearly from these figures, in order to obtain the minimum acceptable texturization rate of 85%, there will be generally required a ripening period of 10 days or more and a heating temperature of 60° C. −100° C.

After the texturized curd, obtained from all of the defatted soybeans according to the aforementioned method, is thawed in water, it is dehydrated under pressure, and then frozen rapidly as described above. Subsequently, the frozen curd is ripened repeatedly at the aforementioned temperature of $-10°$ C. - $-3°$ C., preferaply $-5°$ C. - $-3°$ C., thereby providing a tofu-like food with improved elasticity. Further, the resultant tofu-like food may be rendered frozen-tofu-like by drying in air.

When the method according to the present invention is applied with defatted soybeans, there may be generally obtained products higher in elasticity than when using whole soybeans, while we may obtain optionally such curd as hard as the frozen tofu as well as one as soft as the regular tofu by adding 35 weight % or less of edible oil such as bean oil as compared with the defatted soybeans and a small amount of emulsifier. The addition of the edible oil may be performed at time of or before or after preparation of the suspension. If the edible oil is added after preparation of the suspension, however, the suspension will be required to be agitated fully after the addition.

In this invention, there may be also added a variety of foods including seaweeds, yolk, almonds, etc. as well as seasonings. These foodstuffs or seasonings may be added properly at time of watering and crushing of material soybeans or the preparation of the suspension.

According to this invention, as stated above in detail, all or more of whole or defatted soybeans used as raw materials may be turned into a uniform and stable high-density suspension without employing any coagulant and texturized totally by freezing and ripening as they are, so that there will be produced substantially no portions to be abandoned such as "okara" and "yu" portion characteristic of the prior art, thereby resulting in a yield of 85% to nearly 100%. Further, the method of this invention requires no coagulant as has conventionally been used, it naturally requires neither water-bleaching process for tofu nor softening process with liquid ammonia or "kansui" as has been required at time of preparation of frozen tofu in the conventional method, thereby keeping a good balance of the nutrition peculiar to soybeans.

Furthermore, the products may be dealt with and offered for sale in a satisfactory aseptic condition by using an enclosed-type container for freezing and ripening.

EXAMPLE (EMBODIMENT) 1

150g of swollen soybeans, immersed in water for 15 hours, were boiled for 40 minutes and deodorized. Then these soybeans were washed with water, drained of water, 200ml of water were added, and then crushed by a crusher for 2 minutes until totally dispersed in the water. Then this was twice subjected to subdivision and homogenization by means of a disperser at 400kg/cm² immediately after being heated to 80° C., and turned into a stable high-density suspension. Thereafter, the suspension was frozen rapidly in a sealed aluminium tray at $-20°$ C. and, after completion of freezing, placed in a cold room kept at $-5°$ C. - $-3°$ C. for 21 days, and then a tissue food was obtained. When such food was thawed in water, there was obtained a final product with the texturization rate of 90%. When it was seasoned and eaten, it proved to be as smooth and tasty as the conventional tofu without a bean-like smell.

EXAMPLE 2

A 7 second vapor treatment at 100° C., in lieu of the boiling of the swollen soybeans as in Example 1, provided a tofu-like food with the texturization rate of 87%. This food proved just as tasty as that of Example 1.

EXAMPLE 3

Employing a homogenizer instead of the disperser of Example 1, a high-density suspension was obtained by removing a precipitated portion at about 20% after centrifugation at 3,000rpm for 15 minutes. A tofu-like food with the texturization rate of 88% was obtained in the same manner as in Example 1. This food proved just as tasty as that of Example 1.

EXAMPLE 4

450ml of water was added to 100g of defatted soybeans, which was agitated and dispersed by means of a mixer, heated to 90° C., and then added with 30g of bean oil and 0.2g of soybeans lecithin. Thereafter, tofu-like curd with the texturization rate of 91% was obtained by freezing and ripening a high-density suspension prepared in just the same manner as in Example 1. These tissue food proved as soft as the ordinary tofu.

EXAMPLE 5

When 6g of yolk was added in preparing the high-density suspension as in Example 1, the resultant tofu-like food contained the flavor of yolk.

EXAMPLE 6

Tofu-like curd as obtained in Example 1 was once thawed with tap water, and then frozen rapidly and ripened again under the same conditions as in Example 1. It was further thawed in water and then dried in air. The dried tissue curd, when immersed in water, was readily turned into soft tofu-like curd.

What we claim is:

1. A method for producing a tofu-like food product comprising preparing an aqueous slurry containing from 1/9 to ¼ by weight of crushed soybeans, heating said slurry at between 60° C. and 100° C. for a period of time sufficient to thermally denature the soybean protein, further crushing while dispersing said soybeans in said slurry to a level of subdivision sufficient to form a stable suspension, rapidly freezing said suspension to between −50° C. and −10° C., and ripening said suspension at between −10° C. and −3° C. for a period of time sufficient to texturize protein contained therein.

2. The method of claim 1 wherein said aqueous slurry of crushed soybeans is prepared by immersing whole soybeans in water for between 6 and 18 hours, heating said immersion treated soybeans for a time sufficient to effect deodorization but not to substantially denature protein, adding sufficient water to said deodorized soybeans to obtain a mixture in the ratio of from 3 to 8 parts by weight of water to one part of soybeans, and then crushing said soybeans and water mixture to form said aqueous slurry of crushed soybeans.

3. The method of claim 1 wherein said suspension is ripened for at least 10 days.

4. The method of claim 1 wherein ingredients selected from the group consisting of seasoning ingredients, seaweeds, yolk and almonds are added so that they become incorporated in said suspension prior to said rapid freezing thereof.

5. The method of claim 1 wherein said crushed soybeans in said aqueous slurry of crushed soybeans are defatted soybeans, and wherein an edible oil up to 35 weight is added to said defatted soybeans prior to said rapid freezing of said suspension.

6. A tofu-like food prepared according to the method of claim 1.

* * * * *